United States Patent
Werny et al.

(10) Patent No.: US 10,895,307 B2
(45) Date of Patent: Jan. 19, 2021

(54) SLIDE RAIL FOR A WRAP-AROUND MEANS OF A CONTINUOUSLY VARIABLE TRANSMISSION AND MEASUREMENT METHOD FOR DETERMINING A TORQUE PRESENT AT A CONE PULLEY PAIR

(71) Applicant: Schaeffler Technologies AG & Co. KG, Herzogenaurach (DE)

(72) Inventors: Pierre Werny, Eckwersheim (FR); Reinhard Stehr, Bühl (DE); Andreas Götz, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 344 days.

(21) Appl. No.: 15/763,049

(22) PCT Filed: Aug. 30, 2016

(86) PCT No.: PCT/DE2016/200406
§ 371 (c)(1),
(2) Date: Mar. 23, 2018

(87) PCT Pub. No.: WO2017/054808
PCT Pub. Date: Apr. 6, 2017

(65) Prior Publication Data
US 2018/0274674 A1    Sep. 27, 2018

(30) Foreign Application Priority Data

Sep. 29, 2015   (DE) .................. 10 2015 218 664

(51) Int. Cl.
*F16H 7/18*    (2006.01)
*G01L 5/04*    (2006.01)
(Continued)

(52) U.S. Cl.
CPC ............... *F16H 7/18* (2013.01); *G01L 5/042* (2013.01); *F16H 59/14* (2013.01); *F16H 61/66272* (2013.01); *F16H 2007/185* (2013.01)

(58) Field of Classification Search
CPC ..... F16H 7/18; F16H 2007/185; G01L 1/103; G01L 1/106; G01L 5/042; G01L 5/105; G01L 5/106; G01L 5/107; G01L 5/108
See application file for complete search history.

(56) References Cited

U.S. PATENT DOCUMENTS 4,501,642 A * 2/1985 Wells .................. B65H 23/044
162/198
5,698,796 A * 12/1997 Hirano .................. G01L 5/042
73/160
(Continued)

FOREIGN PATENT DOCUMENTS

CN    101660603 A    3/2010
DE    4234294 A1    4/1993
(Continued)

OTHER PUBLICATIONS

DE10357852_English_translated.*
International Search Report for PCT/DE2016/200406; 3 pgs; dated Dec. 7, 2016 by European Patent Office.

*Primary Examiner* — Minh Truong
(74) *Attorney, Agent, or Firm* — Kevin Lewis Parks

(57) ABSTRACT

A slide rail for a continuously variable transmission is disclosed that comprises at least one slide surface arranged for guiding a wrap-around mechanism that connects a first cone pulley pair to a second cone pulley pair of the continuously variable transmission to transfer torque therebetween. The slide rail includes at least one acceleration sensor arranged so that an acceleration of the slide rail perpendicular to the at least one slide surface can be detected by the acceleration sensor.

5 Claims, 2 Drawing Sheets

(51) Int. Cl.
*F16H 61/662* (2006.01)
*F16H 59/14* (2006.01)

(56) References Cited

U.S. PATENT DOCUMENTS

| | | | | |
|---|---|---|---|---|
| 7,185,546 | B2 * | 3/2007 | Le | G01L 5/042 |
| | | | | 73/801 |
| 8,328,005 | B2 * | 12/2012 | King | B65G 43/00 |
| | | | | 198/810.04 |
| 8,376,883 | B2 * | 2/2013 | Inoue | F16H 9/24 |
| | | | | 474/140 |
| 9,228,909 | B1 * | 1/2016 | Rembisz | G01M 13/023 |
| 9,778,098 | B2 * | 10/2017 | Miyata | G01H 13/00 |
| 10,267,696 | B2 * | 4/2019 | Miyata | G01L 5/042 |
| 2004/0066521 | A1 * | 4/2004 | Swab | G01L 5/042 |
| | | | | 356/614 |
| 2004/0154413 | A1 * | 8/2004 | Coy | G01M 13/028 |
| | | | | 73/862.453 |
| 2005/0187053 | A1 * | 8/2005 | Kim | F16H 7/08 |
| | | | | 474/136 |
| 2011/0244999 | A1 * | 10/2011 | Nakamura | F16H 9/18 |
| | | | | 474/91 |
| 2014/0096608 | A1 | 4/2014 | Themm et al. | |
| 2016/0201790 | A1 * | 7/2016 | Shibata | F16H 9/18 |
| | | | | 474/8 |

FOREIGN PATENT DOCUMENTS

| | | |
|---|---|---|
| DE | 19610216 A1 | 9/1997 |
| DE | 10017005 A1 | 10/2000 |
| DE | 10357852 A1 | 8/2005 |
| KR | 1020120023444 A | 3/2012 |
| WO | 2008/078981 A1 | 7/2008 |
| WO | 2014/012741 A1 | 1/2014 |

* cited by examiner

SLIDE RAIL FOR A WRAP-AROUND MEANS OF A CONTINUOUSLY VARIABLE TRANSMISSION AND MEASUREMENT METHOD FOR DETERMINING A TORQUE PRESENT AT A CONE PULLEY PAIR

CROSS-REFERENCE TO RELATED APPLICATIONS

This application is the U.S. National Phase of PCT Appln. No. PCT/DE2016/200406 filed Aug. 30, 2016, which claims priority to DE 10 2015 218 664.4 filed Sep. 29, 2015, the entire disclosures of which are incorporated by reference herein.

TECHNICAL FIELD

The present disclosure concerns a slide rail for a wrap-around means of a continuously variable transmission, a continuously variable transmission for a drive train and a drive train, in particular for a motor vehicle, and a measurement method for determining a torque that is present at a cone pulley pair, a control program, a control program product and a control unit.

BACKGROUND

From the prior art, continuously variable transmissions are known, with which at least in certain regions a continuous variation of the transmission ratio (step-up or step-down) is possible. Such a continuously variable transmission is known for example from DE 100 17 005 A1. A preferred embodiment of a continuously variable transmission is referred to as a CVT transmission.

SUMMARY

The continuously variable transmission comprises two cone pulley pairs, each of which comprises two cone pulleys. The cone pulleys are each aligned to each other with the conical surfaces thereof. A wedge-shaped pulley is thus formed between the cone pulleys of a pair of cone pulleys. The two conical surfaces can be displaced relative to each other along the common axis of rotation thereof between a maximum separation position and a minimum separation position. In most cases, one cone pulley is axially fixed and the other cone pulley is axially displaceable. Thus, the wedge-shaped pulley is of variable form. By means of a common wrap-around means, for example a transmission chain, the two cone pulley pairs are connected together so as to transfer torque. The wrap-around means comprises a plurality of flexing axles, for example by means of a plurality of chain bolts for a transmission chain or infinitely many theoretical flexing axles in the case of a belt. The wrap-around means travels radially outwards in a cone pulley pair if the cone pulleys thereof are fed towards each other, and the wrap-around means travels radially inwards in a cone pulley pair if the pairs of cone pulleys are moved apart. As a rule, said movement is carried out exactly oppositely at the pairs of cone pulleys in a continuously variable transmission, whereas the distance between the pairs of cone pulleys is fixed, so that the tension in the chain remains (almost) constant without a deflecting mechanism or tensioning mechanism for the wrap-around means having to be provided.

A transmission input shaft is rotationally fixed relative to a first cone pulley pair and a transmission output shaft is rotationally fixed relative to a second cone pulley pair, which is connected by means of the wrap-around means so as to transfer torque. A transmission ratio can be adjusted depending on the ratio of the selected distance of the cone pulleys of a pair of cone pulleys from each other to the selected distance of the other pair of cone pulleys.

In some application areas, the continuously variable transmission is combined with a normal manual gearbox with fixed gears, so that a greater spread of transmission ratios is achieved with a relatively small number of fixed gears.

In the prior art, a (hydraulic) torque sensor is used, such as is known for example from DE 42 34 294 A1. Said controller is very accurate, but is very expensive and cannot be implemented neutrally in terms of installation space. Alternatively, an electronic controller is used, by means of which a contact pressure of the wrap-around means is calculated based on an engine torque calculated in the engine control unit from variables such as throttle flap angle, injection quantity and other engine parameters. Said controller is inexpensive and can be implemented neutrally in terms of installation space, but for some applications is too inaccurate. Especially under partial load, particularly with down-sized engines, said torque signal proves relatively inaccurate.

Based upon this, it is the object of the present disclosure to at least partly overcome the disadvantages that are known from the prior art. The features according to the present disclosure result from the independent claims, for which advantageous configurations are described in the dependent claims. The features of the claims can be combined in any technically meaningful manner, wherein the explanations from the following description and the features from the figures, which include additional embodiments of the present disclosure, can also be included for this.

The present disclosure concerns a slide rail for a wrap-around means of a continuously variable transmission, wherein the slide rail comprises at least one slide surface for guiding a wrap-around means and furthermore at least one acceleration sensor, wherein the at least one acceleration sensor is designed such that an acceleration of the slide rail perpendicular to the at least one slide surface can be detected by means of the at least one acceleration sensor.

Because the wrap-around means exits non connection-tangentially from the wedge-shaped pulley formed between the cone pulleys of a pair of cone pulleys, in particular because of a polygonal course resulting from a (mainly) finite graduation of a chain, and other dynamic effects when running in and out of the wedge-shaped pulley, and as a result of variations of the transmission ratio or as a result of rotational irregularities and other vibrations, the wrap-around means is set oscillating about the central plane thereof. The central plane of the wrap-around means (or in brief the plane of oscillation) is the shortest tangential connection of the set active circle of the pairs of cone pulleys, i.e. the distance of the conical frustum of the disk formed between the cone pulleys, which corresponds to the width of the wrap-around means. Thus, the position of the plane of oscillation varies with the change of the transmission ratio. The plane of oscillation usually coincides with the central plane in the direction of motion of the respective strand, i.e. the load strand, sometimes also referred to as the traction strand, or the return strand, sometimes also known as the thrust strand, of the wrap-around means. In order to reduce said oscillations, in the prior art slide rails with at least one slide surface, preferably two opposing slide surfaces, are used on both sides of the plane of oscillation. The at least one slide surface lies over as much of the wrap-around means as possible with the minimum possible play. Such slide rails are for example known from the aforementioned DE 00 17 005 A1 or from WO 2014/012 741 A1. The slide rail is designed for a load strand and for a return strand, possibly with structural adaptations.

It has been known that the oscillation of the wrap-around means or the strands can be used as information for the currently applied torque and in doing so provides very accurate values. The mathematical-physical relationship is described below.

The applied torque ($M_D$) can be calculated from the tensile forces in the strands, namely the tensile force ($T_Z$) in the load strand and the tensile force ($T_L$) in the return strand, by forming the difference in tension thereof and multiplying by the radius (lever arm) ($r_a$) of the currently set encircling loop:

$$M_D = T_Z \cdot r_a - T_L \cdot r_a = (T_Z - T_L) \cdot r_a \qquad (1.1)$$

The currently applied radius ($r_a$) is a variable parameter, which however is already determined in the prior art for setting a desired transmission ratio and is therefore known. The tensile force ($T_Z$) in the load strand is referred to below as the traction tensile force ($T_Z$) and the tensile force ($T_L$) in the return strand as the return tensile force ($T_L$).

The oscillation frequency ($f_Z$ or $f_L$) of a strand is a function of the tensile force in the strand ($T_Z$ or $T_L$), which can be represented to a sufficiently accurate approximation by the physical oscillation relationship of an ideal chord with a length (L) and an area density ($\mu$) as follows:

$$f_Z = \frac{1}{2L} \cdot \sqrt{\frac{T_Z}{\mu}} \text{ or } f_L = \frac{1}{2L} \cdot \sqrt{\frac{T_L}{\mu}} \qquad (1.2)$$

Rearranging said function accordingly gives the following:

$$T_Z = \mu \cdot (2 \cdot L \cdot f_Z)^2 \text{ or } T_L = \mu \cdot (2 \cdot L \cdot f_L)^2 \qquad (1.3)$$

The length (L) and area density ($\mu$) of the strands are approximately constant and known variables. The area density ($\mu$) has the unit mass (of the chord) per length (of the chord) [kg/m]. Said values are in principle identical for the return strand and the load strand and are known and constant because of the configuration and/or by empirical adjustment.

If said formula (1.3) is used to calculate the tensile force in the strand ($T_Z$ or $T_L$) in the formula (1.1) given above to calculate the torque ($M_D$), we obtain the applied torque ($M_D$) directly from the oscillation frequencies ($f_Z$ and $f_L$) and the known currently set radius ($r_a$):

$$(1.4) \overset{e}{\Rightarrow} M_D = (\mu \cdot (2 \cdot L \cdot f_Z)^2 - \mu \cdot (2 \cdot L \cdot f_L)^2) \cdot r_a$$

$$(1.5) \Leftrightarrow M_D = r_a \cdot \mu \cdot 4 \cdot L^2 (f_Z - f_L)^2$$

A simple relationship thus results between the oscillation frequencies ($f_Z$ and $f_L$) and the torque that is present ($M_D$), which can be used here in a simple manner by providing an acceleration sensor in the slide rails. In this case, the acceleration sensor is arranged to determine the accelerations perpendicular to the slide surface. With the attachment of the acceleration sensors to the (respective) slide rail, it is ensured that the same is always oriented with the (main) measuring direction perpendicular to the plane of oscillation, since the slide rail is suitably movably suspended. This also has the advantage that the tensile forces in the strands ($T_Z$ and $T_L$) can be monitored at the same time.

Alternatively or in addition, a plurality of acceleration sensors are provided that are used for cleaning up the measurement values, for example for lateral acceleration components or thermal effects (as a Wheatstone bridge). Preferably, an acceleration sensor is referred to below, wherein this means the entire measuring arrangement on a unit or even a plurality of measuring arrangements or units.

According to an advantageous embodiment, the slide rail comprises a cast element and the at least one acceleration sensor is molded into the cast element.

For many applications, it is advantageous to manufacture the slide rail, preferably completely, of plastic and to produce the same as an injection molded part. Because of the relatively low temperatures, simple acceleration sensors can be integrated directly within the cast element during the injection molding. As a result, the acceleration sensor can be correctly oriented directly in the manufacturing process and secured in said position for the entire operating life. Moreover, in a preferred embodiment the acceleration sensor is integrated in an installation space-neutral manner within an otherwise conventional slide rail.

According to a further aspect of the present disclosure, a continuously variable transmission for a drive train is proposed that comprises at least the following components:

at least one transmission input shaft with a first cone pulley pair;
at least one transmission output shaft with a second cone pulley pair;
at least one wrap-around means, which joins the first cone pulley pair to the second cone pulley pair so as to transfer torque, and in doing so forms a load strand and a return strand. The continuously variable transmission is above all characterized in that at least one acceleration sensor is provided for the load strand and for the return strand, wherein the at least one acceleration sensor is arranged so that an acceleration of the respective strand perpendicular to the plane of oscillation can be detected by means of the acceleration sensor, wherein furthermore a control unit for the torque-dependent adjustment of the contact pressure of a respective one of the pairs of cone pulleys is preferably included.

With the continuously variable transmission proposed here, a torque can be transferred with a step up or step down, wherein the transfer is continuously adjustable at least in certain regions. In this case, the transmission ratio is adjusted by means of the two cone pulley pairs as described above. In this case, the wrap-around means is disposed between the mutually relatively movable cone pulleys of a pair of cone pulleys and transfers a torque from one cone pulley pair to the other cone pulley pair. The at least one slide rail is always oriented in contact with and parallel to the wrap-around means. The oscillations of a strand can be determined by means of an acceleration sensor, which is disposed externally, for example by means of a high-frequency distance-measuring laser sensor. A first acceleration sensor for the load strand and a second acceleration sensor for the return strand are preferably provided.

The oscillation frequencies of the strands can be detected by means of the at least one acceleration sensor. The oscillation frequencies in turn can be used to determine the torque according to the mathematical approximation shown above.

The contact pressure on both pairs of cone pulleys or the respective cone pulley pair, for which the torque has been calculated (by using the respective radius and suitable sign inversion), is preferably controlled by a control unit by means of the torque determined in this way. The control unit is preferably an integral component of the continuously variable transmission. Alternatively, the control unit is formed by a central or (a plurality of) distributed computing unit(s), by means of which only the continuously variable transmission or further components of a drive train or in addition other tasks are processed.

According to one advantageous embodiment of the continuously variable transmission, at least one of the acceleration sensors is disposed in a slide rail according to an embodiment as described above.

By fixing the acceleration sensor on a slide rail, a particularly simple design of the measuring arrangement that is particularly preferably neutral in terms of installation space, is possible. Preferably, two slide rails are provided, each with at least one acceleration sensor for each strand.

According to a further aspect of the present disclosure, a drive train is proposed that comprises a drive unit with an output shaft, at least one load and a continuously variable transmission according to an embodiment as in the above description, wherein the output shaft can be connected for torque transfer to the at least one load with a variable transmission ratio by means of the continuously variable transmission.

The drive train is arranged to transfer torque that is provided by a drive unit, for example an energy conversion machine, for example a combustion engine or an electric motor, and output by means of the output shaft thereof for use as needed, i.e. while taking into account the required revolution rate and the required torque. The application is for example at least one drive wheel of a motor vehicle and/or an electrical generator for providing electrical energy. Conversely, receiving inertial energy introduced by for example a drive wheel, which forms the drive unit, by means of the continuously variable transmission into an electrical generator for recovery, i.e. the electrical storage of the braking energy, can be accomplished with a suitably arranged torque transfer strand. Furthermore, in a preferred embodiment a plurality of drive units are provided, which can be operated connected in series or in parallel or decoupled from each other, and the torque of which can be made available for use as required by means of a continuously variable transmission according to the above description. Examples are hybrid drives with an electric motor and a combustion engine, but also multi-cylinder engines in which individual cylinders (or groups of cylinders) can be turned on. In order to transfer the torque under control and/or by means of a manual gearbox with different transmission ratios, the continuously variable transmission described above is particularly advantageous, since a large continuous step-free spread of transmission ratios can be achieved in a small space. The measuring device proposed here for detecting the oscillation frequencies of the strands can be implemented with a small installation space or even neutrally in terms of installation space. In addition, the measurement method or control method can be simply implemented with only three control variables, namely the two oscillation frequencies and the currently set radius of the encircling loop, and does not require complex control technology.

According to a further aspect of the present disclosure, a motor vehicle is proposed that comprises at least one drive wheel that can be driven by means of a drive train according to the above description.

Most motor vehicles nowadays comprise a front-wheel drive and have the drive unit, for example a combustion engine or an electric motor, arranged in front of the driver's cab and along the main direction of travel. The installation space is particularly small with such an arrangement and it is therefore particularly advantageous to use a continuously variable transmission of a small size. The use of a continuously variable transmission in motorized two-wheelers is similar, for which significantly increased power for the same installation space is required. At the same time, the reliability of such systems must be kept constant or even increased, since the acceptance of maintenance by users is low.

This problem is aggravated in passenger vehicles of the small car class according to the European classification. The units used in a passenger vehicle of the small car class are not significantly smaller compared to passenger vehicles of the larger car classes. Nevertheless, the available installation space in small cars is significantly smaller. The drive train described above comprises a continuously variable transmission that does not require a conventional torque sensor, or for higher detection accuracy of the torque compared to a continuously variable transmission with a conventional torque sensor can be implemented neutrally in terms of installation space or even more compactly. In this case, the detection accuracy is significantly improved compared to the indirect electronic determination of the torque that is currently present from engine parameters.

Passenger vehicles are assigned to a class of vehicle according to for example size, price, weight and power, wherein said definition is subject to constant change according to the demands of the market. In the US market, vehicles of the small car class and the very small car class according to the European classification are assigned to the subcompact car class and in the British Market they correspond to the supermini class or the city car class. Examples of the very small car class are a Volkswagen up! or a Renault Twingo. Examples of the small car class are an Alfa Romeo Mito, Volkswagen Polo, Ford Fiesta or Renault Clio.

According to a further aspect of the present disclosure, a measurement method is proposed for determining a torque that is present on a cone pulley pair, preferably the input side (first) cone pulley pair, of a continuously variable transmission with a wrap-around means, which connects a first cone pulley pair to a second cone pulley pair so as to transfer torque and in doing so forms a load strand and a return strand, preferably a continuously variable transmission according to an embodiment in accordance with the above description, wherein the measurement method comprises at least the following steps:

a. detecting the first acceleration of the load strand transverse to the plane of oscillation of the load strand and detecting the second acceleration of the return strand transverse to the plane of oscillation of the return strand;

b. determining the oscillation frequency of the load strand and determining the oscillation frequency of the return strand based on the accelerations detected in step a.;

c. based on the physical oscillation relationship of an ideal chord to the area density, determining the traction tensile force in the load strand and determining the thrust tensile force in the return strand based on the oscillation frequencies determined in step b.; and d. determining the torque on the cone pulley pair by forming a tensile force difference from the thrust tensile force and the traction tensile force determined in step c. and multiplying said tensile force difference by the currently set encircling radius on the relevant cone pulley pair.

By means of the measurement method indicated here, it is possible to accurately detect the torque on a cone pulley pair without a considerable measurement cost, and preferably without the necessity for additional installation space. For this purpose, only the accelerations of the load strand and the return strand transverse to the respective plane of oscillation are detected. From the respective acceleration, the oscillation frequency ($f_Z$ or $f_L$) of the load strand or the return strand is determined. From this, as shown above the respective tensile force in the strand ($T_Z$ or $T_L$) can be determined. The additional information necessary for this, i.e. the length (L) of the strands and the area density (μ) of the strands, are identical for the return strand and the load strand in principle, and are known and constant because of the configuration and/or owing to empirically determined adjustment. The torque on a cone pulley pair can now be determined from this by multiplying the tensile force difference (±[$T_Z$-$T_L$]) by the currently set radius on the relevant cone pulley pair. If the direction of the torque is known, the magnitude of the tensile force difference (|$T_Z$-$T_L$|) can be used. Alternatively, to determine the direction of the torque for the input-side cone pulley pair, the (positive) thrust tensile force is subtracted from the (positive) traction tensile force and for the output-side cone pulley pair the (positive) traction tensile force is subtracted from the (positive) thrust tensile force.

The acceleration of the load strand or the return strand transverse to the respective plane of oscillation can be determined in any conventional way. Particularly preferably, the respective acceleration is determined by means of an acceleration sensor in the respective slide rail, preferably in accordance with an embodiment according to the above description. This enables a simple, and particularly preferably an installation space-neutral, design.

Particularly preferably, the determined torque is used in a control method for controlling the contact pressure for the respective cone pulley pair or both pairs of cone pulleys. The relationship between the torque that is present and the required contact pressure is for example known from DE 42 34 294 A1. Thus, in said control method, a step e. is then performed at the step d., wherein the contact pressure of the relevant pair of cone pulleys or both pairs of cone pulleys is adjusted based on the torque determined in step d. In doing so, it is achieved that a torque can be reliably transferred from the cone pulley pair to the wrap-around means or from the wrap-around means to the other cone pulley pair.

According to a further aspect of the present disclosure, a control program is proposed that can be implemented in a control unit that comprises the measurement method or a control method in accordance with an embodiment according to the preceding description, wherein the contact pressure of the pair of cone pulleys is adjusted based on the determined torque.

The control program can be implemented on a controller that comprises a processor and is implemented by means of the respective actuators in a specific machine action. The controller itself forms a control unit or the controller together with the corresponding actuators forms a control unit. In this case for example, the pneumatic or hydraulic pressure on the axially movable cone pulley of the pair of cone pulleys is adjusted depending on the torque determined by detecting the oscillation frequency and the currently set radius of the wrap-around means in the cone pulley pair. Preferably, the control program can also, for example for test purposes, be implemented on an external (multifunctional) controller and/or in a simulation. In this case, the control program comprises known and already used process components that are necessary and/or have been established for implementation.

According to a further aspect of the present disclosure, a control program product is proposed that comprises the control program in accordance with an embodiment according to the preceding description.

The control program product comprises the control program stored on a solid device, such as for example a CD, DVD, Blue-Ray-Disc, a USB flash memory, a (server) hard disk or a specially designed board. If the control program product is read in, then it is embodied ready for operation in a computing unit, preferably a specially designed controller or control system, preferably after copying the control program or after installation. The process stored as a control program and/or on the control program product can be implemented in a modular form in this case and can obtain necessary known and already used process components for implementing the method from other sources, such as for example a server on the Internet. Moreover, additional hardware for implementing the method, such as for example sensors, can be incorporated.

According to a further aspect of the present disclosure, a control unit for a continuously variable transmission is proposed, by means of which the measurement method can be implemented in accordance with an embodiment according to the above description or a control program can be implemented in accordance with an embodiment according to the above description.

The control unit is preferably a component of a conventional control system of a continuously variable transmission and/or an engine controller. Preferably, the control unit is disposed in the housing of the continuously variable transmission and in communication with the corresponding sensors or indirectly connected to analysis units, so that the control unit has access to the raw data and/or to prepared data. The control unit comprises for this a plurality of control operators, which are preferably implemented in a (micro) processor or a suitable memory unit. The operators carry out the sub steps of the measurement method or the control methods for controlling the contact pressure. The control unit comprises actuators for applying the control and/or accesses external actuators for this purpose.

BRIEF DESCRIPTION OF THE DRAWINGS

The present disclosure described above is described in detail below against the relevant technical background with reference to the associated drawings, which show preferred configurations. The present disclosure is in no way limited by the purely schematic drawings, wherein it should be said that the drawings are not true to scale and are not suitable for the definition of dimensional relationships. In the figures

DETAILED DESCRIPTION

Figure 1:
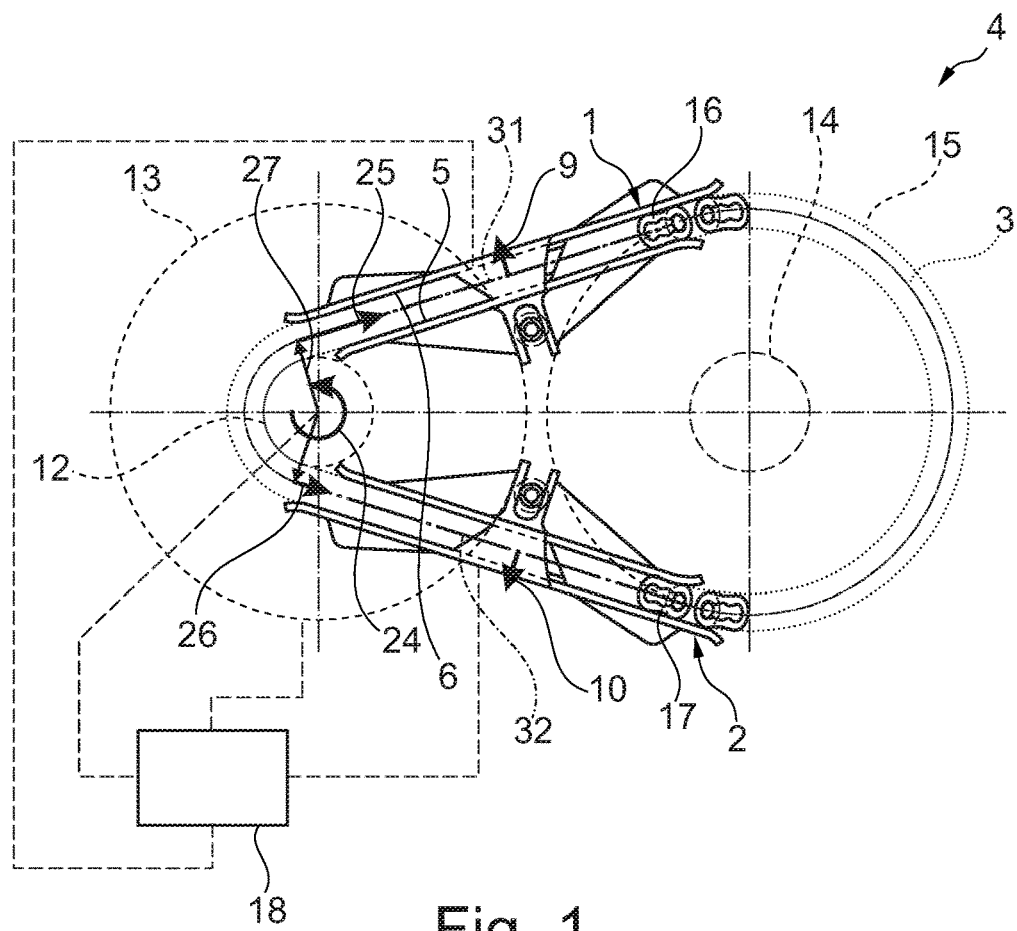
FIG. 1: shows a continuously variable transmission with a control unit.

In FIG. 1, a continuously variable transmission 4 is shown, in which a first slide rail 1 and a second slide rail 2 are provided for the common wrap-around means 3. On both sides of the strands 16 and 17 of the wrap-around means 3, the slide rails 1 and 2 comprise slide surfaces 5 and 6 (here only denoted on the first slide rail 1). Of the wrap-around means 3, for the load strand 16 and for the return strand 17 in each case, three representative chain elements are indicated and for the rest the wrap-around means 3 is represented with dashed lines for better clarity. Here, the wrap-around means 3 for the first cone pulley pair 13 are disposed on a minimum encircling radius 27 and for the second cone pulley pair 15 are accordingly disposed on the maximum encircling radius 27 (not explicitly shown here). By means of the different encircling radii 27, a torque 24 can be transferred from the transmission input shaft 12 stepped up or down to a transmission output shaft 14 and vice-versa. In order to determine the torque 24, here by way of example on the transmission input shaft 12, here the first acceleration 9 of the load strand 16 transverse to the plane of oscillation 31 of the load strand 16 and the second acceleration 10 of the return strand 17 transverse to the plane of oscillation 32 of the return strand 17 are detected. From this, as shown in the preceding description, the traction tensile force 25 or the thrust tensile force 26 can be simply calculated based on known values (length and area density) and the physical relationship of a chord to area density. If the difference in tension between the strand tensile forces 25 and 26 is formed and multiplied by the currently set encircling radius 27, we get the currently applied torque 24. Based on the torque 24 determined in this way, the contact pressure of a pair of cone pulleys 13 or both pairs of cone pulleys 13 and 15 can be suitably adjusted by means of a control unit 18.

Figure 2:
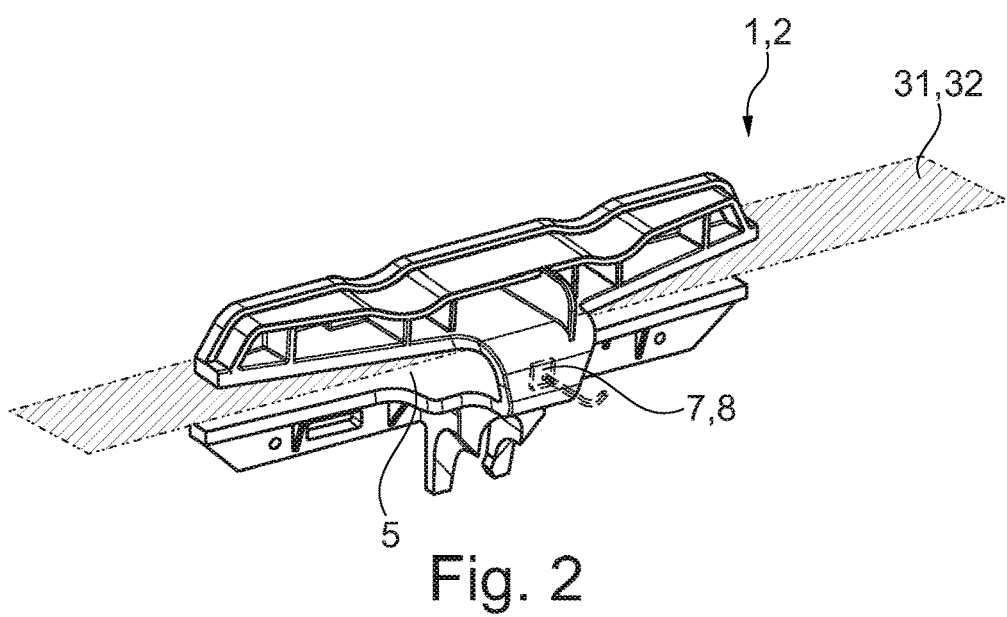
FIG. 2: shows a slide rail with an acceleration sensor.

In FIG. 2, a slide rail 1 or 2, or half of a paired slide rail, is shown, which can be used both for the load strand 16 and also for the return strand 17 (cf. FIG. 1) in an identical design. In this case, only the first slide surface 5 can be seen and the second slide surface 6 is concealed in said representation. Between the first slide surface 5 and the second slide surface 6, the respective plane of oscillation 31 or 32 is disposed, which is always disposed parallel to the slide surfaces 5 and 6. Thus, an acceleration sensor 7 or 8, which is integrated within the slide rail 1 or 2, is preferably cast with the (primary) measuring direction oriented transversely to the plane of oscillation 31 or 32. Thus, a correctly oriented measurement and at the same time an installation space-neutral arrangement are enabled here, whereby the measurement method or control method described above can be implemented in a particularly simple and reliable manner in for example a continuously variable transmission 4 as shown in FIG. 1.

Figure 3:
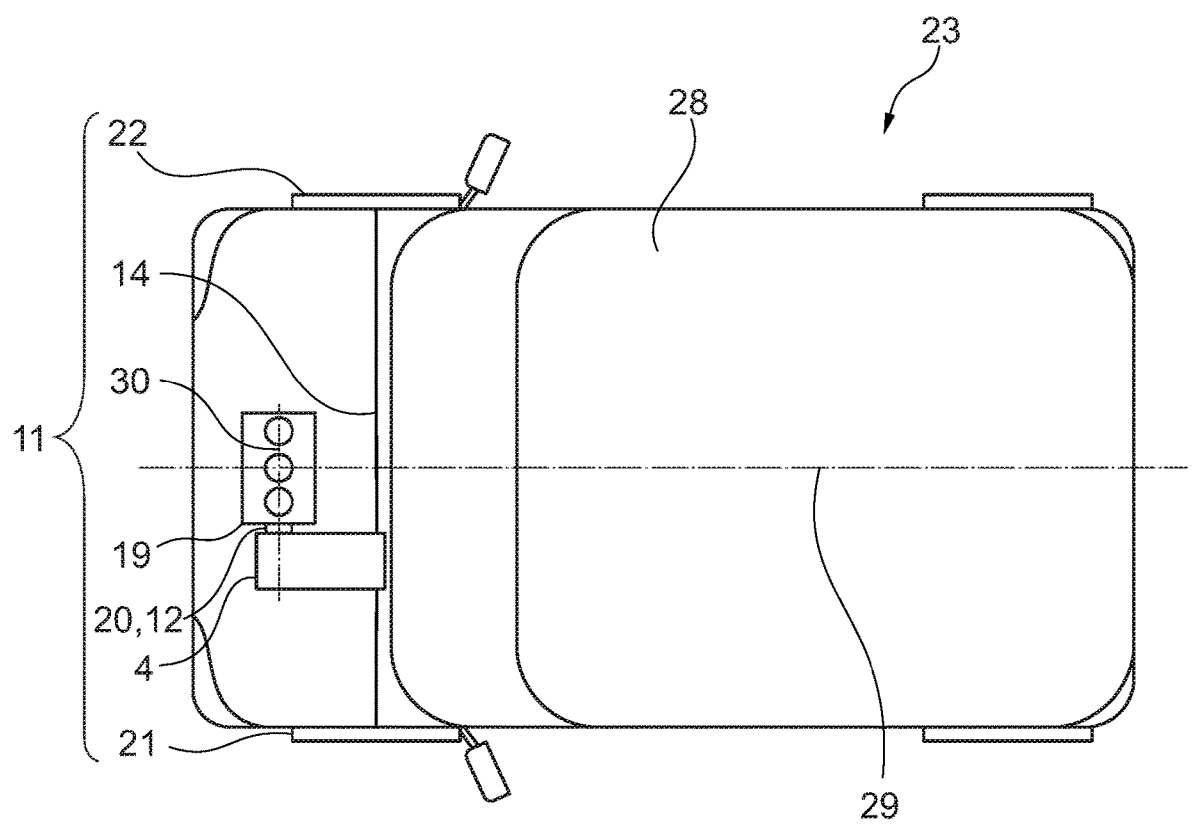
FIG. 3: shows a drive train in a motor vehicle with a continuously variable transmission.

In FIG. 3, a drive train 11 comprising a drive unit 19, here represented as a combustion engine, an output shaft 20, a continuously variable transmission 4 and a left drive wheel 21 and a right drive wheel 22 connected so as to transfer torque, are represented schematically. The output shaft 20 of the drive unit 19 forms the transmission input shaft 12 at the same time. The shafts to the drive wheels 21 and 22 are connected to the transmission output shaft 14 so as to transfer torque. The drive train 11 is disposed here in a motor vehicle 23, wherein the drive unit 19 is disposed in front of the driver's cab 28 with the motor axis 30 thereof transverse to the longitudinal axis 29.

With the continuously variable transmission and measurement method proposed here, particularly accurate determination of the torque that is currently present is enabled without requiring additional installation space and expensive components.

REFERENCE CHARACTER LIST 1 first slide rail
2 second slide rail
3 wrap-around means
4 continuously variable transmission
5 first slide surface
6 second slide surface
7 first acceleration sensor
8 second acceleration sensor
9 first acceleration
10 second acceleration
11 drive train
12 transmission input shaft
13 first cone pulley pair
14 transmission output shaft
15 second cone pulley pair
16 load strand
17 return strand
18 control unit
19 drive unit
20 output shaft
21 left drive wheel
22 right drive wheel
23 motor vehicle
24 torque
25 tensile force
26 thrust tensile force
27 encircling radius
28 driver's cab
29 longitudinal axis
30 motor axis
31 load strand plane of oscillation
32 return strand plane of oscillation

The invention claimed is:

1. A continuously variable transmission for a vehicle drive train, comprising:
a transmission input shaft comprising a first cone pulley pair;
a transmission output shaft comprising a second cone pulley pair;
a wrap-around mechanism connecting the first cone pulley pair to the second cone pulley pair to transfer torque from the transmission input shaft to the transmission output shaft, the wrap-around mechanism comprising:
a load strand; and
a return strand;
a first acceleration sensor arranged to displace with the load strand to detect a first acceleration of the load strand perpendicular to a load strand plane of oscillation;
a second acceleration sensor arranged to displace with the return strand to detect a second acceleration of the return strand perpendicular to a return strand plane of oscillation; a slide rail, the slide rail including a slide surface arranged for guiding the wrap-around mechanism, wherein the first acceleration sensor or the second acceleration sensor is disposed in the slide rail; and
a control unit configured for torque-dependent adjustment of a contact pressure of a respective one of the first cone pulley pair or the second cone pulley pair.

2. The continuously variable transmission as claimed in claim 1, wherein the wrap-around mechanism is a transmission chain.

3. The continuously variable transmission as claimed in claim 1, wherein the wrap-around mechanism comprises a plurality of flexing axles, the wrap-around mechanism being configured to travel radially outwards if the first and second cone pulley pairs are fed towards each other, and the wrap-around mechanism being configured to travel radially inwards if the first and second cone pulley pairs are moved apart.

4. The continuously variable transmission as claimed in claim 1, wherein torque applied on the first cone pulley pair or the second cone pulley pair can be determined from a difference between a first tensile force in the load strand and a second tensile force in the return strand, wherein the difference is multiplied by a radius of a currently set encircling loop.

5. The continuously variable transmission as claimed in claim 4, wherein the first tensile force is based on an oscillation frequency of the load strand and the second tensile force is based on an oscillation frequency of the return strand, wherein the oscillation frequency of the load strand or the return strand is determined from the acceleration of the respective load strand or the return strand.

* * * * *